US006137252A

United States Patent [19]
Kojima et al.

[11] Patent Number: 6,137,252

[45] Date of Patent: Oct. 24, 2000

[54] CONTROLLER OF A STEPPING MOTOR, CONTROL METHOD FOR THE MOTOR AND TIMING DEVICE

[75] Inventors: Hiroyuki Kojima; Hiroshi Yabe, both of Shiojiri, Japan

[73] Assignee: Seiko Epson Corporation, Tokyo, Japan

[21] Appl. No.: 09/186,780

[22] Filed: Nov. 4, 1998

[30] Foreign Application Priority Data

Nov. 5, 1997 [JP] Japan .................................... 9-303201
Sep. 22, 1998 [JP] Japan .................................. 10-268533

[51] Int. Cl.[7] ................................ H02P 8/00; G04C 3/00

[52] U.S. Cl. .......................... 318/586; 318/696; 368/217; 368/188

[58] Field of Search .................................... 318/138, 245, 318/254, 685, 696, 687, 686; 368/217, 218, 219, 184, 186–189, 200, 201, 202

[56] References Cited

U.S. PATENT DOCUMENTS

| | | | |
|---|---|---|---|
| 3,945,191 | 3/1976 | Van Berkum | 58/4 |
| 4,549,230 | 10/1985 | Odaka | 360/8 |
| 4,727,468 | 2/1988 | Maekawa | 363/41 |
| 4,866,237 | 9/1989 | Inoue | 219/76.13 |
| 5,068,586 | 11/1991 | Kawahara | 318/696 |
| 5,231,343 | 7/1993 | Nakamura | 318/696 |

FOREIGN PATENT DOCUMENTS

| | | |
|---|---|---|
| 53-139566 | 12/1978 | Japan . |
| 10-80195 | 3/1998 | Japan . |

*Primary Examiner*—Paul Ip

[57] ABSTRACT

A power-saving controller for controlling a stepping motor mounted in an electronic wristwatch. A pulse signal generator in the controller combines two pulse signals GPi and GPi+2 having different duty factors using a compositing signal CP, based on a reference signal BP, thereby compositing a pulse signal GPi+1 having an intermediate duty factor. Even if the frequency of the reference signal BP is lowered, a step size for controlling the duty factor of a drive pulse is prevented from expanding, thereby keeping the driving power required by the stepping motor from increasing. The lowering of the frequency of the reference signal BP reduces the power consumption of the circuit of the wristwatch, and thus of the controller.

9 Claims, 5 Drawing Sheets

CONTROLLER OF A STEPPING MOTOR, CONTROL METHOD FOR THE MOTOR AND TIMING DEVICE

BACKGROUND OF THE INVENTION

1. Field of the Invention

The present invention relates to a controller of a stepping motor and its control method and, in particular, to a power-saving type controller which is useful for driving a stepping motor in an electronic timepiece, and a control method of the stepping motor.

2. Description of the Related Art

Stepping motors, also called pulse motors or digital motors, are driven by a pulse signal and find widespread use as an actuator in digital control devices. Compact electronic devices and information handling apparatuses, appropriate for portable use, have been recently developed, and miniature and light-weight stepping motors are widely employed in these devices. Timing devices such as an electronic timepiece or watch, and timing switches are typical of such electronic devices. In the timing device, an oscillator circuit employing a crystal oscillator generates a reference pulse, which is then converted into a timing signal having a frequency appropriate for timing purposes, for example 1 Hz. A drive pulse is supplied to the stepping motor in synchronization with the timing signal to drive a second hand in the timing device.

Since a power supply for use in such a portable electronic device is subject to limited space allocation and other limitations, it is important to reduce power consumed by a stepping motor and the like for reliable operation and extended life of the device. For this reason, in an electronic timepiece employing a stepping motor, the root-mean-square value of a drive pulse supplied to the stepping motor is automatically set to an appropriate value to match a condition unique to each electronic timepiece or operational conditions. The power consumption by the stepping motor is thus reduced. Several methods for controlling the root-mean-square value of the drive pulse are available. In one method, the drive pulse is controlled by changing its pulse width or pulse height. In another method, the drive pulse is formed of a plurality of sub-pulses, and the root-mean-square value of the drive pulse is controlled by changing the duty factor of the sub-pulses.

In addition to the reduction in the power consumption by the stepping motor, every attempt is made to reduce the overall power consumption by the electronic device. It is also contemplated today that the power consumed in an oscillator circuit is reduced by lowering the oscillation frequency of a reference pulse (reference signal) output by the oscillator circuit employing a crystal oscillator, for example. By lowering the frequency of the reference pulse, the component count of a frequency divider, for example, is reduced, and the reduction in the operational frequency in the circuit in turn reduces the power consumption.

A controller that controls the root-mean-square value of the drive pulse according to the duty factor of the sub-pulses suffers a drop in the control resolution of the duty factor of the sub-pulses when the frequency of the reference pulse fed by the oscillator circuit is lowered. Specifically, when the frequency of the reference pulse is 32 kHz, the duty factor of a pulse signal of 1 kHz can be controlled in step sizes of 1/32 (resolution). When the frequency of the reference pulse drops to half, namely, to 16 kHz, the duty factor is controlled in step sizes of 1/16, and the control resolution is substantially degraded. This makes it difficult to control the root-mean-square value of the drive pulse to a small but sufficient current matching the operational state of the stepping motor. To prevent a timepiece hand from running in an erratic fashion under insufficient power of the drive pulse, the electronic timepiece is supplied with the drive pulse of a high root-mean-square value rather than narrow step-sized drive pulse based on a high-frequency reference pulse. This increases the power consumption by the motor, and the timing device therefore fails to take advantage of the power savings available with a low-frequency reference pulse.

OBJECTS OF THE INVENTION

Therefore, it is an object of the present invention to overcome the aforementioned problems.

Accordingly, it is an object of the present invention to provide a controller of a stepping motor and a control method of the stepping motor, which control the duty factor of a drive pulse in a resolution practically higher than the oscillation frequency of a reference signal, through a simple method and with a simple construction, to reduce the power consumption in a timing device. It is another object of the present invention to provide a controller of a power-saving type stepping motor for use in a portable device and a control method of the stepping motor.

SUMMARY OF THE INVENTION

According to the present invention, pulse signals having different duty factors are composited in a selected ratio. The controller generates a pulse signal having an intermediate duty factor with respect to a pulse signal having a duty factor normally derived from the reference signal, and maintains the control resolution of the root-mean-square value of the drive pulse at a conventional level or raises it above the conventional level, even when the oscillation frequency of the reference signal is lowered. The controller of a stepping motor of the present invention comprises a pulse generator for generating a first pulse signal having a first duty factor and a second pulse signal having a second duty factor, based on a reference signal, a compositing unit for outputting alternately the first pulse signal and the second pulse signal according to a predetermined ratio, and a drive control unit for feeding, to the stepping motor, a drive pulse having a different duty factor based on a third pulse signal output by the compositing unit, as well as the first and second pulse signals. The control method of a stepping motor, of the present invention, comprises the compositing step of outputting alternately a first pulse signal having a first duty factor and a second pulse signal having a second duty factor according to a predetermined ratio, based on a reference signal, and the driving step of feeding, to the stepping motor, a drive pulse having a different duty factor based on a third pulse signal output through the compositing step, as well as the first and second pulse signals.

In a preferred controller and the control method of the stepping motor of the present invention, a selector selects between the first pulse signal and the second pulse signal, based on a compositing pulse signal having a duty factor of 50%. In this way, a pulse signal, in which the first pulse signal and the second pulse signal appears at an equal ratio, is composited. The composite pulse signal, if averaged over its period, gives an intermediate duty factor between the first and second duty factors. The duty factor of the compositing pulse signal is not limited to 50%. A compositing pulse having any other duty factor may be used so that its resulting composite pulse signal duty factor is any one between the first and second duty factors.

The drive pulse is formed of a plurality of sub-pulses. When the drive control unit powers the stepping motor, the duty factor of the sub-pulses is controlled based on the first and second pulse signals and a composite third pulse signal. Based on the composite third pulse signal, a sub-pulse having a duty factor between the first and second duty factors is generated in addition to the first and second pulse signals. Even when the first and second pulse signals derived from the reference signal present a low control resolution with a large pulse width of the drive pulse, the use of the composite third pulse signal heightens the resolution of the root-mean-square value of the drive pulse, namely, narrows the step size of the drive pulse.

According to the present invention, the electronic device, with a low oscillation frequency of the reference signal, still provides a drive pulse with a narrow step size to the stepping motor. In this way, the stepping motor is provided with a low root-mean-square drive pulse matching the operational state of the stepping motor. The power-saving feature resulting from the use of lower oscillation frequency of the reference signal is thus maintained while still preserving high resolution control of the root-mean-square value of the drive pulse.

By allowing the controller of the present invention to control a hand-driving stepping motor, the root-mean-square value of the drive pulse is precisely or finely controlled even though the oscillation frequency of the reference signal is lowered. In the timing device, the power consumption of the stepping motor is not raised, and the power consumption in its electronics is reduced while the frequency of the reference signal in the oscillator circuit is lowered.

Even with a conventional higher oscillation frequency, the controller of the present invention for the stepping motor controls the root-mean-square value of the drive pulse even more finely than previously available so that the root-mean-square value of the drive pulse supplied to the stepping motor can be reduced to a minimum power still capable of driving the stepping motor. The power consumption of the stepping motor is thus reduced.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

Figure 1:
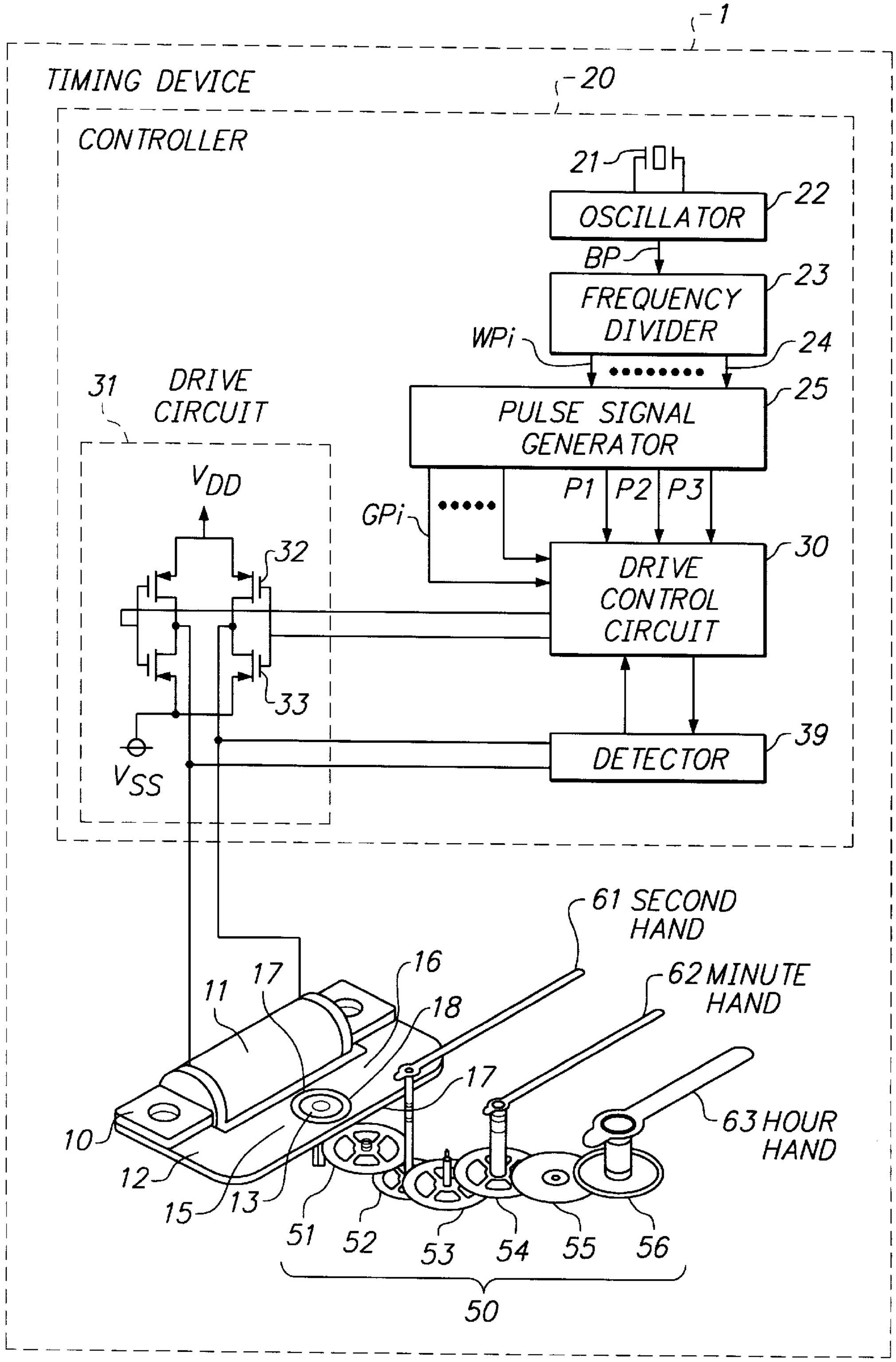
FIG. 1 is a block diagram showing a timing device incorporating a controller of the present invention.

FIG. 1 is a block diagram generally showing a timing device 1, e.g. a watch, of the present invention. The timing device 1 comprises a stepping motor 10, a controller 20 for controlling the stepping motor 10, a wheel train 50 for transmitting the rotation of the stepping motor 10, and a second hand 61, a minute hand 62, and a hour hand 63 driven by the wheel train 50. The stepping motor 10 comprises a driving coil 11 that generates a magnetic force in response to a drive pulse supplied by the controller 20, a stator 12 excited by the driving coil 11, and a rotor 13 that rotates relative to stator 12. The rotor 13 comprises a two-pole, disk-like permanent magnet, and constitutes, with coil 11 and stator 12, a PM-type (permanent-magnet rotary-type) single-phase, stepping motor 10. The stator 12 is provided with magnetically-saturated portions 17 so that different poles are generated under the magnetic force of the driving coil 11, at phases 15 and 16 around the rotor 13. To control the direction of rotation of the rotor 13, the stator 12 has an internal notch at an appropriate position on its inner circumference. With this arrangement, a cogging torque takes place to stop the rotor 13 at an appropriate position.

The rotation of the rotor 13 of the stepping motor 10 is transmitted to each hand through the wheel train 50 that includes a fifth wheel and pinion 51 which is meshed with the rotor 13 via a pinion, a fourth wheel and pinion 52, a third wheel and pinion 53, a second wheel and pinion 54, a minute wheel 55 and an hour wheel 56. The second hand 61 is connected to the shaft of the fourth wheel and pinion 52, the minute hand 62 is connected to the shaft of the second wheel and pinion 54, and the hour hand 63 is connected to the shaft of the hour wheel 56. The time is indicated by these hands moving in step with the rotor 13. A transmission mechanism (not shown) may be connected to the wheel train 50 to indicate the year, the month and the day.

The timing device 1 indicates the time as the rotor 13 of stepping motor 10 rotates. The stepping motor 10 is supplied with a drive pulse in synchronization with a timing signal of a predetermined frequency (e.g., 1 Hz). The controller 20 for controlling the stepping motor 10 comprises an oscillator circuit 22 that outputs a reference pulse BP having a reference frequency using a reference oscillation source 21 such as a crystal oscillator, a frequency divider 23 that frequency-divides the reference pulse to output pulses WPi (WP1 through WPm, where m is an integer) having different frequencies, a pulse signal generator (waveform shaper) 25 that outputs a pulse signal that is used to generate the drive pulse to be fed to the stepping motor 10, based on a group of pulses 24 supplied by the frequency divider 23. The pulse signal generator 25 outputs a plurality of pulse signals. In this embodiment, the pulse signal generator 25 outputs, for example, a fundamental pulse signal P1 for generating the drive pulse DP to be fed to the stepping motor 10, a pulse signal (auxiliary pulse) P2 that is used to feed a sufficiently large drive pulse to the stepping motor 10 for rotation when the rotor 13 of the stepping motor 10 fails to start rotating, and a pulse signal P3 for generating a demagnetizing pulse PE to demagnetize the magnetic force that is resident in the driving coil 11 subsequent to the supply of the large drive pulse.

Figure 1A:
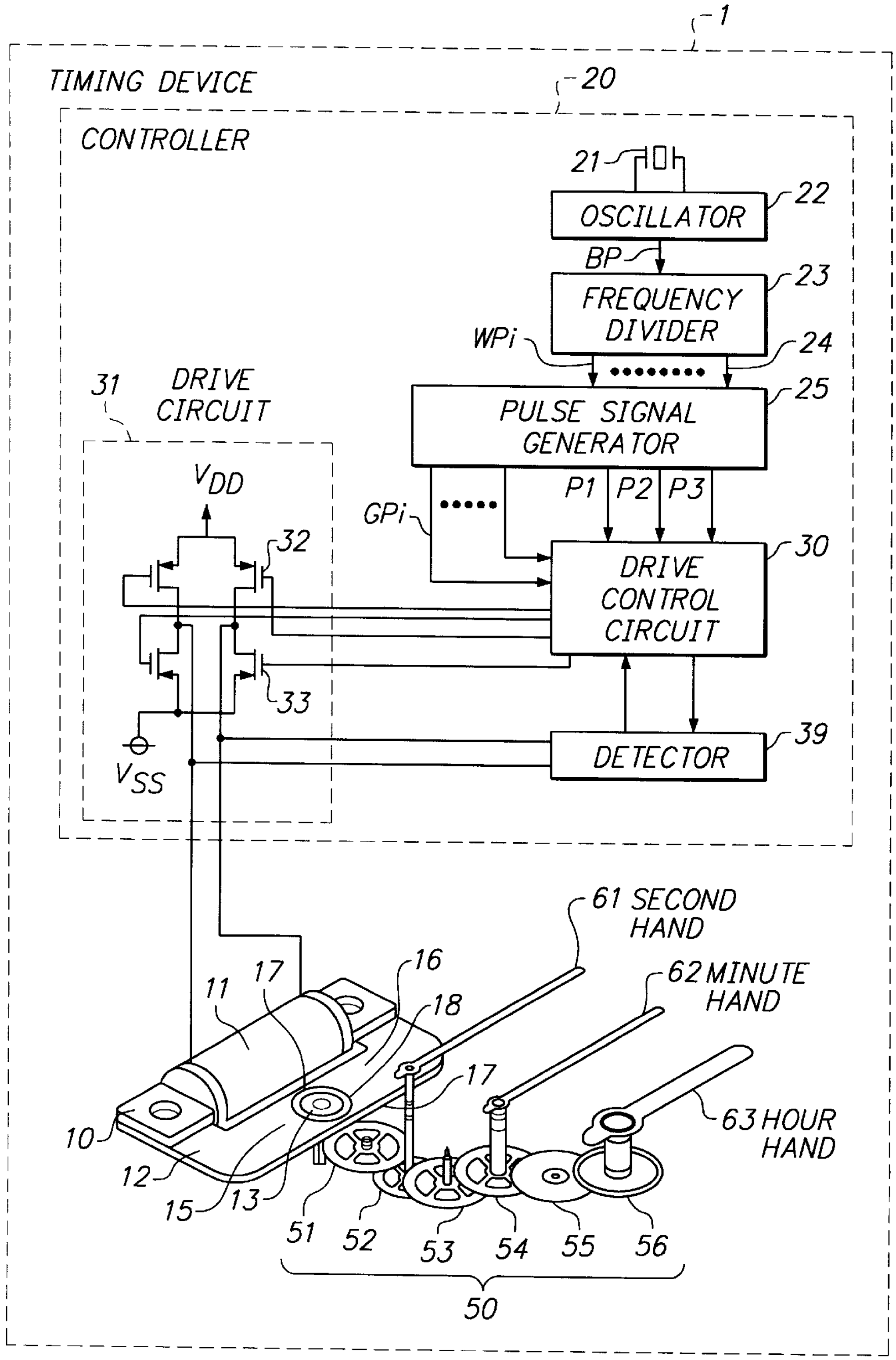
FIG. 1A shows an alternate embodiment of the drive circuit of FIG. 1.

The controller 20 also comprises a drive control circuit 30 that controls CMOS transistors 32 and 33 in a drive circuit 31 in response to the pulse signals supplied by the pulse signal generator 25. The drive circuit 31, controlled by the drive control circuit 30, feeds the drive pulse to the driving coil 11 in the stepping motor 10. The rotor 13 of the stepping motor 10 thus rotates. Connected to the wiring that conducts the drive pulse from the drive circuit 31 to the driving coil 11 is a detector 39 which senses the rotation of the rotor 13 by picking up an induced voltage following the supply of the drive pulse. The drive control circuit 30 is supplied with a sense signal by the detector 39 so that the drive pulse with an optimal root-mean-square value is fed to the stepping motor 10 with appropriate timing. The transistors in drive circuit 31 can be controlled with just two signal lines with the drive pulse on one line and the other line being on (high) or off (low) as shown in FIG. 1 or four signal lines with the drive pulse on two lines and the other two lines being on (high) or off (low) as shown in FIG. 1A to turn the transistors on or off as appropriate to send the drive pulse to driving coil 11 during a motor drive time period or to sense the induced voltage on the line during a detect time period.

The controller 20 generates the drive pulse DP (FIG. 2, for example), which is composed of a plurality of sub-pulses having narrow pulse widths, and the root-mean-square value of the drive pulse DP is controlled by changing the duty factors of the sub-pulses. To this end, the pulse signal generator 25 outputs pulse signals GPi (GP1 through GPn where, n is an integer) for generating the sub-pulses having the different duty factors.

Figure 2:
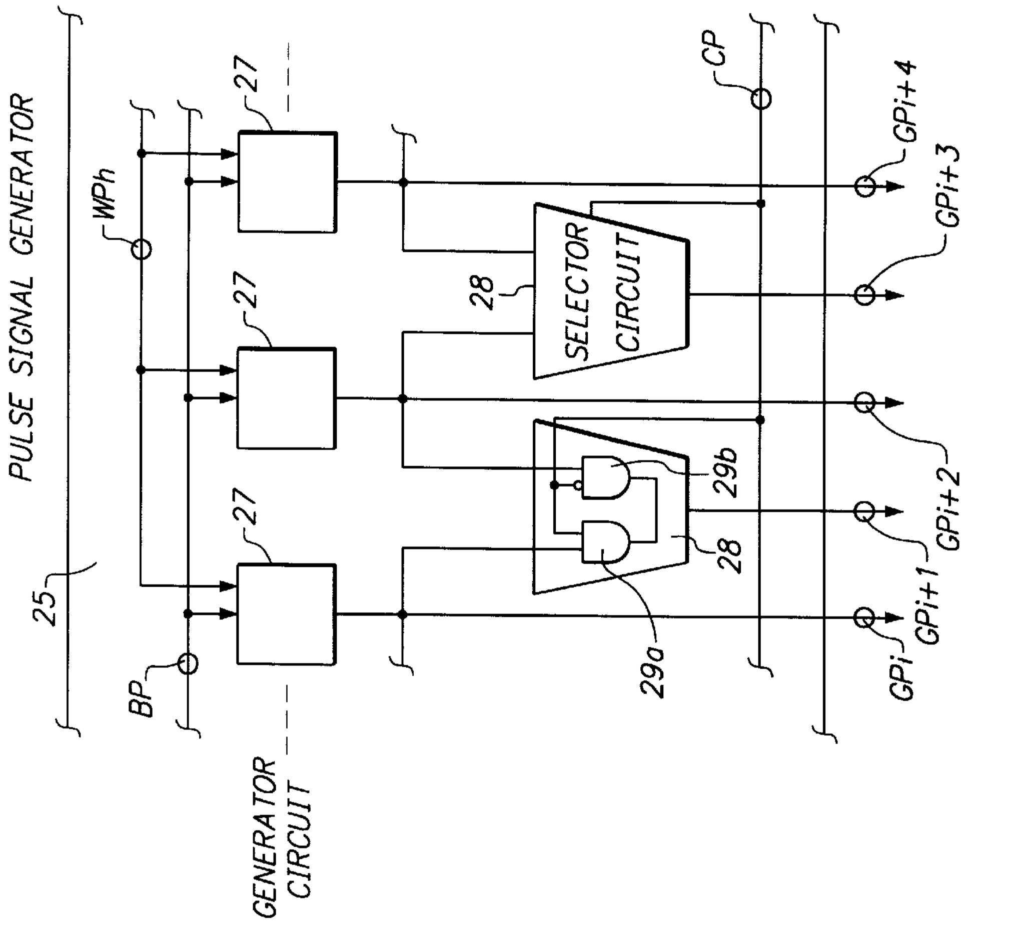
FIG. 2 is a schematic diagram of a compositing circuit that composites pulse signals having different duty factors, in a pulse generator circuit in the controller of FIG. 1.

Referring to FIG. 2, the pulse signal generator 25 generates the pulse signals GPi through GPn, each having a different duty factor. The pulse signal generator 25 in this embodiment includes a plurality of generator circuits 27, each generating a pulse signals GPi through GPn having a resolution (step size) of duty factor of 1/16, based on the reference frequency BP of 32 kHz and a pulse signal WPh of an appropriate frequency, for example, 2 kHz, into which the reference frequency BP is divided. The pulse signals GPi through GPn generated in the generator circuit 27 are fed to the drive control circuit 30. The pulse signal generator 25 in this embodiment includes a selector circuit 28 that receives pulse signals GPi and GPi+2, with a duty factor difference of 1/16 therebetween, output by the generator circuit 27. The selector circuit 28 is a compositing circuit that outputs alternately the pulse signal GPi and the pulse signal GPi+2 having the different duty factors, at a predetermined ratio (50%, for example) as a composite pulse signal GPi+1 having a duty factor differing from that of the pulse signal GPi by 1/32. The pulse signal GPi+1 is fed to the drive control circuit 30, as well as GPi and GPi+2. In the Figures, the pulse signals GPi through GPn are shown as being generated in pulse signal generator 25. However, the circuitry for generating these signals can be included in drive circuit 30. The functional blocks are shown and named as separate circuits for convenience of discussion only.

The selector circuit 28 includes two AND gates 29*a* and 29*b*, the outputs of which are connected to each other. The AND gate 29*a* receives the pulse signal GPi and a compositing pulse signal CP, while the AND gate 29*b* receives the pulse signal GPi+2 and the compositing signal CP inverted. The selector circuit 28 outputs the pulse signal GPi when the compositing signal CP is at a high level, and outputs the pulse signal GPi+2 when the compositing signal CP is at a low level. When the duty factor of the compositing signal CP is 50%, the pulse signal GPi and the pulse signal GPi+2 are output for equal durations. The selector circuit 28 thus outputs a pulse signal having an intermediate duty factor between the pulse signals GPi and GPi+2 having a step width of 1/16. Specifically, the pulse signal GPi+1 has a step width of 1/32. The pulse signal GPi+1 as well as the pulse signals GPi and GPi+2 are fed to the drive control circuit 30 and are used to control the root-mean-square value of the drive pulse DP. The compositing signal CP can be generated by a suitable circuit or device (not shown) such as a fixed logic circuit or a programmable CPU. In the case of a CPU, the duty factor of the compositing signal can be modified by software, for example.

Figure 3:
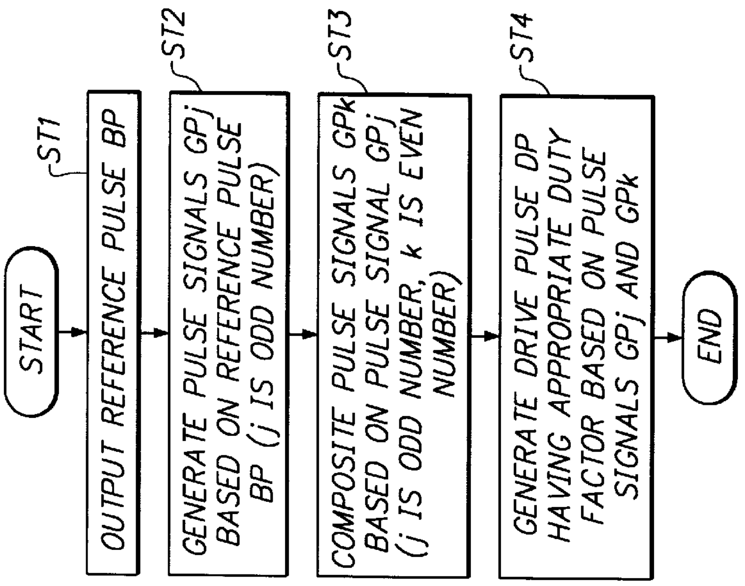
FIG. 3 is a flow diagram showing the process in which the controller of FIG. 1 generates a drive pulse of a different root-mean-square value.

FIG. 3 is a flow diagram showing the process in which the controller 20 generates the drive pulse DP of an optimal root-mean-square value. In step ST1, the oscillator 22 outputs the reference pulse BP. In step ST2, the plurality of generator circuits 27 in the pulse signal generator 25 generate a plurality of pulse signals GPj each having different duty factors. Now let GPj represent an odd-numbered pulse signal generated by the generator circuit 27. In step ST3, a pair of adjacent odd-numbered pulse signals GPj are input to the selector circuit 28. The odd-numbered pulse signals input to the selector circuit 28 are alternately output in accordance with the compositing signal CP and an even-numbered pulse signal GPk between the odd-numbered pair is composited. In step ST4, the odd-numbered pulse signals GPj and the even-numbered pulse signal GPk, namely, all pulse signals GPi (i=1 through n) generated by the pulse signal generator 25 are fed to the drive control circuit 30. The drive control circuit 30 generates the drive pulse of an optimal root-mean-square value, using a pulse signal having an appropriate duty factor among the pulse signals GPi, and feeds it to the stepping motor.

Figure 4:
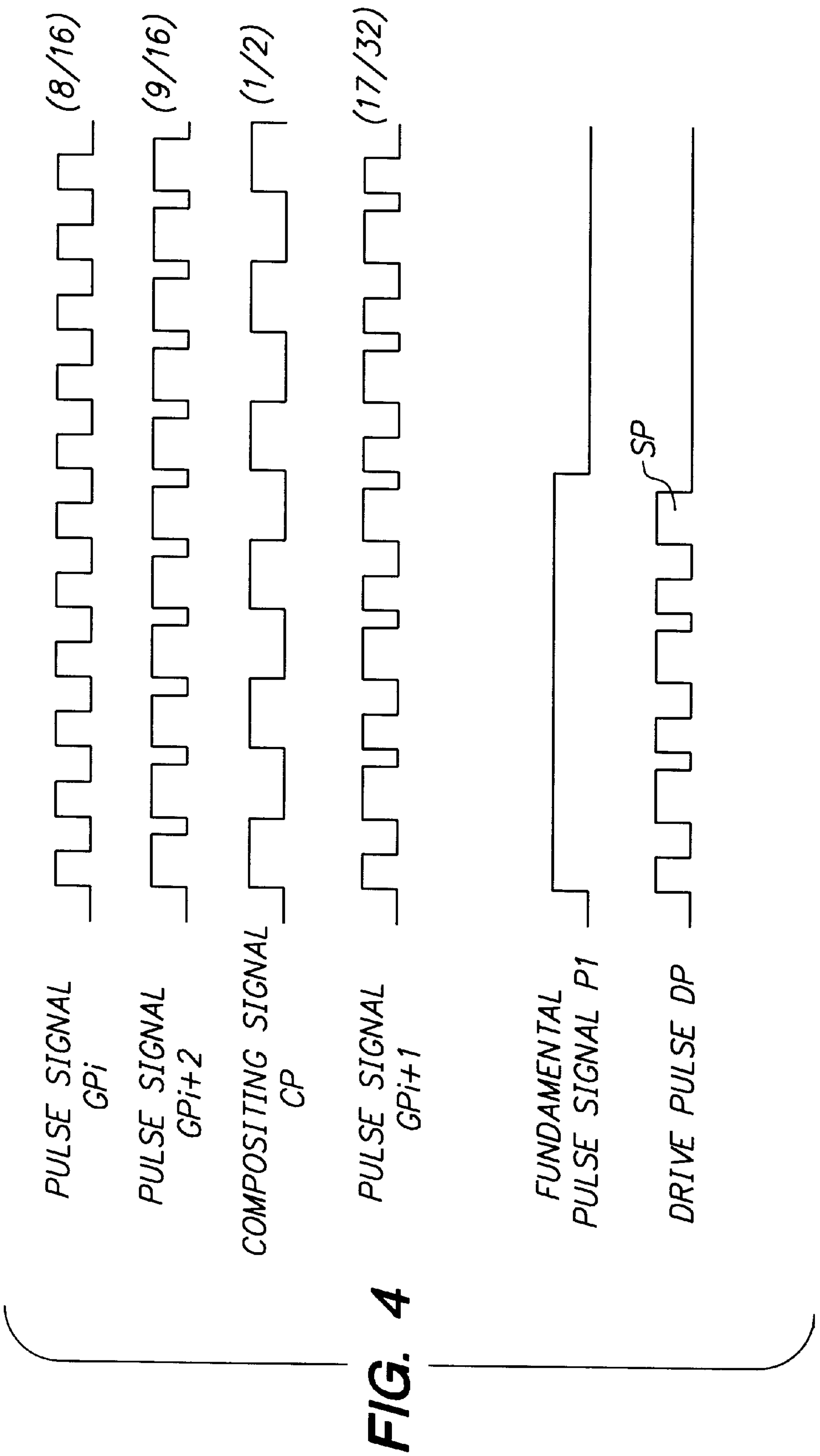
FIG. 4 is a timing diagram showing how the compositing circuit shown in FIG. 2 composites the drive pulse from a pulse signal using the pulse signals of different duty factors.

FIG. 4 is a timing diagram showing how the selector circuit 28 generates a pulse signal having an intermediate duty factor. The 2 kHz pulse signal GPi and 2 kHz pulse signal GPi+2 (the odd-numbered pulse signals GPj referenced in FIG. 3), derived from the reference pulse BP, have duty factors of 8/16 and 9/16, respectively. By compositing these pulse signals in accordance with a 1 kHz compositing signal CP having a duty factor of 50%, the pulse signal GPi and the pulse signal GPi+2 appear alternately. With this arrangement, the composite pulse signal GPi+1 having a duty factor of 17/32 (the even-numbered pulse signal GPk referenced in FIG. 3) is thus obtained. The drive control circuit 30 can then composite the fundamental pulse signal P1 having a pulse width of 3 ms and the composite pulse signal GPi+1 to result in the drive pulse DP constructed of the sub-pulse having a duty factor of 17/32, which is then fed to the drive circuit 31. The drive control circuit 30 selects one of the pulse signals, i.e., GPi, GPi+1, GPi+2, etc., or a combination of pulse signals to composite with the fundamental pulse signal P1 to produce the drive pulse DP. FIG. 4 is just one example where the composite signal GPi+1 is selected by the drive control circuit to produce the drive pulse DP.

Figure 5:
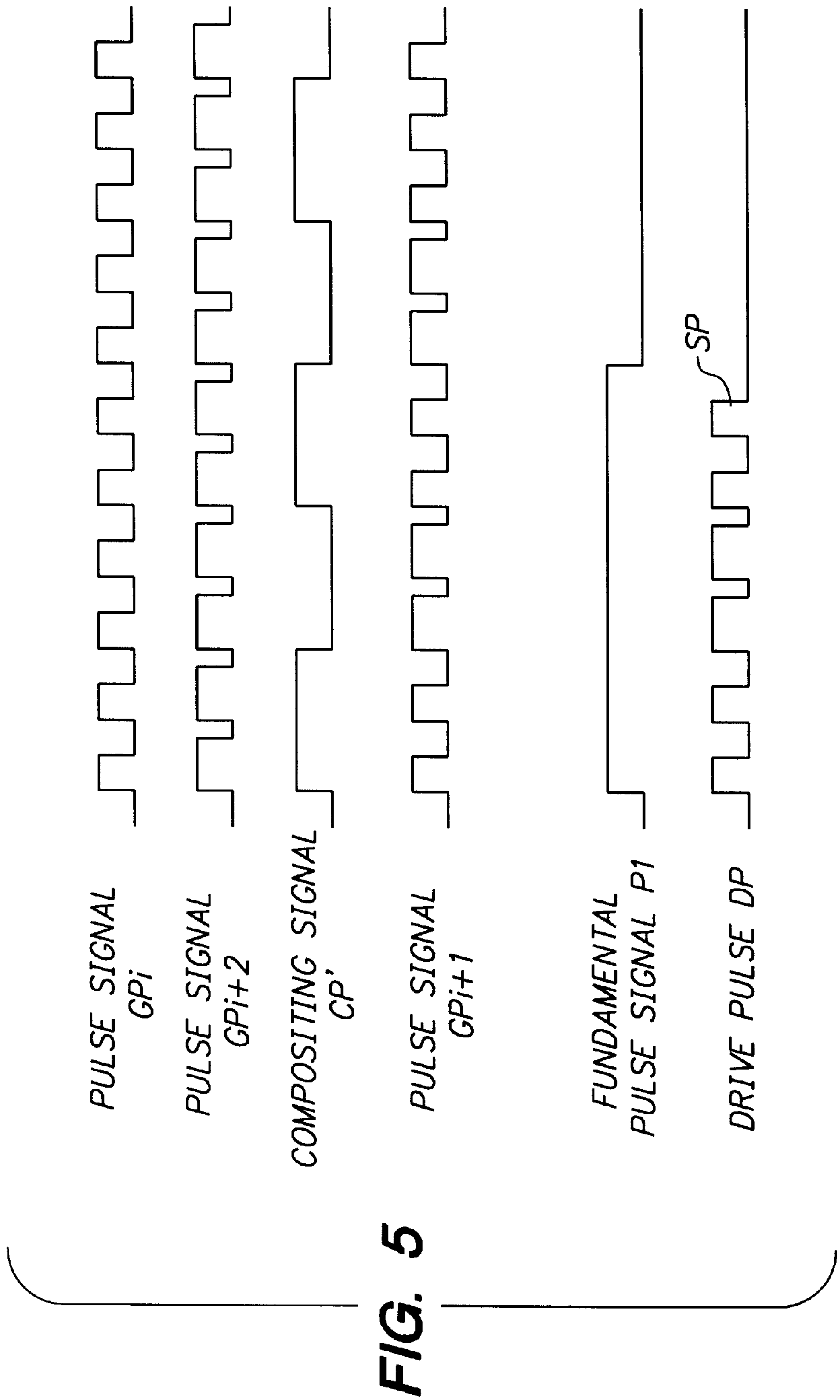
FIG. 5 is a timing diagram showing how a pulse signal of a different duty factor is composited based on a compositing signal different from the one shown in FIG. 4, and how the drive pulse is composited based on that pulse signal.

Referring to FIG. 5, the composite pulse signal GPi+1 is composited using a 0.5 kHz compositing signal CP' which is different from the frequency of compositing signal CP used in FIG. 4. In this case, as well, the composite pulse signal GPi+1 is constructed of the pulse signal GPi and the pulse signal GPi+2, both of which alternately appear every half cycle of the compositing signal CP'. This results in a composite pulse signal GPi+1 which has a duty factor of 17/32, if averaged over the period of the compositing signal CP'. Since the pulse width of the fundamental pulse signal P1 fails to agree with an integer multiple of the period of the compositing signal CP', a combination of the composite pulse signal GPi+1 and the fundamental pulse signal P1 (having a pulse width of 3 ms) results in a drive pulse DP constructed of a sub-pulse SP having an average duty factor of 25/48. By changing the duty factor of the compositing signal CP, a pulse signal GP having an intermediate duty factor may be output. For example, by supplying compositing signals of CP having a duty factor of 25%, 50% and 75%, a pulse signal GP of a duty factor with a step size of 1/64 may be obtained.

The controller 20 of the timing device 1 combines the pulse signals GPi having different duty factors, derived from the reference signal BP, using a compositing signal CP, for example, at a ratio of 50%, and results in a composite pulse signal GPi+1 having a duty factor intermediate the duty factors of the pulse signals GPi. Using the pulse signals GPi and GPi+1, the controller 20 controls the duty factors of the sub-pulses in a step size narrower than the step size directly derived from the reference signal BP, and therefore controls the root,-mean-square value of the drive pulse DP in a resolution higher than that of the reference pulse BP. Given a frequency of the reference signal lower than the frequency of the conventional reference signal BP, the controller 20 still can control the root-mean-square value of the drive pulse DP at a control accuracy comparable to that achieved with a conventional higher frequency reference signal BP. Even with a lower-frequency reference signal BP, an optimal drive pulse of an appropriate root-mean-square value keeps the power consumption of the motor from increasing. By changing the duty factor of the compositing pulse CP, the control step size is further narrowed, further reducing the power consumption of the motor.

Lowering the frequency of the reference signal BP reduces the power consumption of the oscillator 22 and the number of stages of frequency division in the frequency divider 23. The power consumption of the circuit of the device is thus reduced. In the device 1, the use of the low frequency reference signal BP reduces the overall power consumption. By controlling the duty factor of the compositing signal, the frequency of the reference signal BP is lowered even further, leading to a further reduction in power consumption.

With the same oscillation frequency as in conventional devices, the present invention controls the root-mean-square value of the motor drive pulse more precisely. According to the controller and the method of control of the stepping motor, the root-mean-square value of the drive pulse supplied to the stepping motor is finely controlled to the minimum power required to drive the stepping motor. The power consumption of the stepping motor is thus reduced.

The present invention has been discussed in connection with a two-phase stepping motor preferably used in the timing device. The present invention effectively works in multi-phase (two-phase or higher) motors. The driving method of the stepping motor is not limited to a 1-phase excitation. The stepping motor may be driven in 2-phase excitation or in 1-2 phase excitation. The stepping motor, controlled by the controller and the control method of the present invention, is not limited to the PM-type. The present invention may be applied to VR-type and a hybrid type motors.

According to the controller and the control method of the present invention, the pulses having different duty factors, derived from the low-frequency reference signal, are combined to a composite pulse signal having an intermediate duty factor. Even with the reference signal frequency lowered, the duty factor of the drive pulse is controlled in a step size equal to or finer than that available in conventional devices. The root-mean-square value of the drive pulse supplied to the stepping motor is finely controlled to the minimum power required to drive the stepping motor. The power consumption of the stepping motor is thus reduced. The lowering of the reference signal frequency results in the reduction in the power consumption of the circuit of the device and the power consumption for driving the stepping motor is thus reduced.

Since the present invention reduces the power consumption of the controller for controlling the stepping motor, the controller and the control method are suited for portable devices that feature a compact design and are multi-functional. For example, a portable device, such as an electronic wristwatch, consumes more power with multi-function features while its compact design makes the use of a large battery difficult. Instead of a battery, some wristwatches employ a generator such as a solar cell. Even in such a timing device with a small power generation capacity, the control method and the controller of the present invention save power. Extended use and reliable timing are assured.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A controller of a stepping motor comprising:

a pulse generator receiving a reference signal and generating a first pulse signal having a first duty factor and a second pulse signal having a second duty factor, based on said reference signal;

a compositing unit receiving said first and second pulse signals and a compositing signal, and outputting alternately said first pulse signal and said second pulse signal as a composite pulse signal according to a duty factor of said compositing signal, said composite pulse signal having a third duty factor intermediate of said first and second duty factors; and a drive control unit responsive to at least one of said first pulse signal, said second pulse signal and said composite pulse signal for outputting a stepping motor drive signal.

2. A controller of a stepping motor according to claim 1, wherein said compositing signal has a duty factor of 50%, and said compositing unit comprises a selector responsive to said compositing signal for alternately selecting between said first pulse signal and said second pulse signal to form said composite pulse signal.

3. A controller of a stepping motor according to claim 1, wherein said drive signal comprises a plurality of sub-pulses having a duty factor controlled by said drive control unit based on at least one of said first, second and composite pulse signals.

4. A control method of a stepping motor comprising:

receiving a reference signal and generating a first pulse signal having a first duty factor and a second pulse signal having a second duty factor, based on said reference signal;

receiving said first and second pulse signals and a compositing signal and generating alternately said first pulse signal and said second pulse signal as a composite pulse signal according to a duty factor of said compositing signal, said composite pulse signal having a duty factor intermediate said first and second duty factors; and generating a stepping motor drive signal based upon at least one of said first pulse signal, said second pulse signal and said composite pulse signal.

5. A control method of a stepping motor according to claim 4, wherein said compositing pulse signal has a duty factor of 50%.

6. A control method of a stepping motor according to claim 4, wherein said drive signal comprises a plurality of sub-pulses having a duty factor determined by at least one of said first, second and composite pulse signals.

7. A timing device comprising:

an oscillator generating a reference signal;

a pulse generator receiving said reference signal and generating a first pulse signal having a first duty factor and a second pulse signal having a second duty factor, based on said reference signal;

a compositing unit receiving said first and second pulse signals and a compositing signal, and outputting alternately said first pulse signal and said second pulse signal as a composite pulse signal according to a duty factor of said compositing signal, said composite pulse signal having a third duty factor intermediate of said first and second duty factors;

a stepping motor;

a drive control unit responsive to at least one of said first pulse signal, said second pulse signal and said composite pulse signal for outputting a stepping motor drive signal to said stepping motor; and a timepiece hand driven by said stepping motor.

8. A timing device according to claim 7, wherein said compositing signal has a duty factor of 50%, and said compositing unit comprises a selector responsive to said compositing signal for alternately selecting between said first pulse signal and said second pulse signal to form said composite pulse signal.

9. A timing device according to claim 7, wherein said drive signal comprises a plurality of sub-pulses having a duty factor controlled by said drive control unit based on at least one of said first, second and composite pulse signals.

* * * * *